UNITED STATES PATENT OFFICE.

EDWARD HUBBARD RUSSELL, OF PARK CITY, UTAH TERRITORY.

TREATING ORES AND METALLURGICAL PRODUCTS.

SPECIFICATION forming part of Letters Patent No. 331,850, dated April 24, 1888.

Application filed July 2, 1886. Renewed March 12, 1888. Serial No. 266,951. (No specimens.)

*To all whom it may concern:*

Be it known that I, EDWARD HUBBARD RUSSELL, of Park City, in the county of Summit, and in the Territory of Utah, have invented a certain new and useful Improvement in Treating Ores and Metallurgical Products; and I do hereby declare that the following is a full, clear, and exact description thereof.

In my application No. 206,150, filed June 24, 1886, and now pending, I have set forth, described, and claimed a process for the extraction of metals from ores or metallurgical products, which consists, broadly, in first subjecting the ore or product to the action of a solution of a copper salt or compound, preferably sulphate of copper or blue-stone, and then treating it with a hyposulphite leaching solution. The object of using the copper-compound solution on the ore or product is fully set forth in such application. It is to counteract the injurious effects of the hydrates of various elements which may exist in the ore or product, and which very materially interfere with and prevent the full and complete dissolving action of a hyposulphite leaching solution, and to form in the said hyposulphite solution, as it passes down through the ore, cupreous hyposulphite, changing the solution into the compound or "extra" solution described in my Patents Nos. 295,815 and 295,816.

In carrying out my process, as set forth in my said pending application, I use the copper salt or compound in solution, preferably aqueous, such solution being prepared previous to its use on the ore. I have found, however, that similar results in decomposing and neutralizing caustic soda or lime, or the hydrates of other metals existing in the ore, and in forming cupreous hyposulphite in the hyposulphite solution, can be obtained by the use of a copper salt or compound in a way other than as described in said application. Instead of using it in solution in the first step of the process and saturating the ore or metallurgical product with such solution, I use the copper salt or compound in the present process in the solid state. Said salt or compound, preferably the sulphate of copper or blue-stone, is broken up or ground into small pieces and mixed with the ore or product to be treated, either before the ore or product is put into the leaching-tub or afterward. After the charge has thus been prepared I subject it to the action of an ordinary hyposulphite solution, either by leaching or in any other desired way. As the hyposulphite solution passes through the mixed ore and copper salt or compound, there is formed, by such salt or compound acting upon the hyposulphite in the solution, a cupreous hyposulphite solution or the extra solution used in carrying out the processes described and claimed in my patents hereinbefore referred to. The formation of this said solution is aided by the compounds of copper which may be formed in the ore. I have found, also, that the neutralization of the injurious effects of caustic soda or lime or other hydrates existing in the ore is secured and effected by the copper compound or salt met and carried along through the ore by the leaching solution. Any caustic soda or lime or other hydrate which may exist in the hyposulphite solution used is also neutralized by the copper compound.

In this process, as in the one covered by my pending application, it is the cupreous hyposulphite solution or extra solution—such as is described in my patents—that acts upon the ore during the second step of the process. The present process then involves a novel method of preparing such solution. I contemplate also using in the second step of the process covered in the present case the cupreous hyposulphite or extra solution already prepared, instead of the ordinary hyposulphite solution; but I prefer the latter.

In practice I use from one to five pounds of blue-stone for each ton in the charge to be treated. This proportion, however, can be varied indefinitely, as desired, without departure from my invention.

I prefer, as indicated hereinbefore, to use sulphate of copper or blue-stone for the first step, but contemplate using instead other salts or compounds of copper—as, for instance, the chloride, nitrate, carbonate, or acetate.

The copper salt used need not be intimately mixed with the ore or product to be treated. If desired, it could be spread on top of the mass or mixed with only the upper layer of such mass.

Having thus described my invention, what I claim is—

1. As an improvement in the art of extracting metals from ores and metallurgical products by means of a leaching solution, the method of preparing the ore for the use of the solution, which consists in placing in the path of the solution through the ore or product a compound or salt of copper, substantially as and for the purpose described.

2. As an improvement in the art of extracting metals from ores and metallurgical products, the method of preparing the mass of ore or product for the leaching solution, which consists in mixing with such ore or product a salt or compound of copper, substantially as and for the purpose described.

3. The process of extracting metals from ores and metallurgical products, which consists in placing a salt or compound of copper so that it will be passed through by the leaching solution and then treating the mass with a hyposulphite leaching solution, substantially as and for the purpose described.

4. The process of extracting metals from ores and metallurgical products, which consists in mixing with the ore or product sulphate of copper and then treating the mass with a hyposulphite solution, substantially as and for the purpose described.

In testimony that I claim the foregoing I have hereunto set my hand this 15th day of June, 1886.

EDWARD HUBBARD RUSSELL.

Witnesses:
WILL. E. RACE,
CHARLES HERMAN.